US006980331B1

(12) United States Patent
Mooney et al.

(10) Patent No.: US 6,980,331 B1
(45) Date of Patent: Dec. 27, 2005

(54) AUTOMATIC SEND TO EMBEDDED FAX/E-MAIL ADDRESS

(75) Inventors: Philip D. Mooney, North Wales, PA (US); Richard M. Ubowski, Harleysville, PA (US); Joseph A. Zebrowski, Norristown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/452,198

(22) Filed: Dec. 2, 1999

(51) Int. Cl.[7] .............................................. H04N 1/00

(52) U.S. Cl. ..................... 358/400; 358/3.28; 358/474; 379/100.08

(58) Field of Search ................................ 358/474, 401, 358/400, 461, 402, 405, 3.28, 403, 426.12; 382/291, 292; 379/100.06, 100.08, 100.17, 379/403, 426.12

(56) References Cited

U.S. PATENT DOCUMENTS

| | | | | | |
|---|---|---|---|---|---|
| 4,893,333 | A | * | 1/1990 | Baran et al. ................. | 379/100 |
| 5,278,674 | A | * | 1/1994 | Webb et al. ................. | 358/475 |
| 5,461,488 | A | * | 10/1995 | Witek .......................... | 358/402 |
| 5,602,589 | A | * | 2/1997 | Vishwanath et al. ... | 375/240.11 |
| 5,659,164 | A | * | 8/1997 | Schmid et al. .............. | 235/375 |
| 5,781,310 | A | * | 7/1998 | Nakamura et al. .......... | 358/468 |
| 5,870,375 | A | * | 2/1999 | Maeda et al. ............ | 369/275.3 |
| 6,219,150 | B1 | | 4/2001 | Eguchi ........................ | 358/1.15 |
| 6,567,176 | B1 | * | 5/2003 | Jeyachandran et al. .... | 358/1.14 |
| 2002/0186780 | A1 | * | 12/2002 | Choi et al. ................... | 375/270 |
| 2003/0014264 | A1 | * | 1/2003 | Fujii et al. ................... | 704/500 |

FOREIGN PATENT DOCUMENTS

| | | | | |
|---|---|---|---|---|
| EP | 1107570 | * | 6/2001 | ............ H04N 1/32 |
| JP | 62269551 | * | 11/1987 | |
| JP | 06030125 | * | 2/1994 | |

* cited by examiner

Primary Examiner—Jerome Grant, II

(57) ABSTRACT

Embedded writing or typing in a fax document or white board presentation are detected in a predetermined region of the document, recognized and converted into textual data corresponding to the fax telephone number or e-mail of the recipient of the document. The fax telephone number is automatically dialed without requiring the user to input the telephone number or even select a speed dial telephone number, although the use of confirmation of the scanned and textually converted fax telephone number or e-mail is within the principles of the present invention. In a first embodiment, the present invention adds the capability to a fax machine to scan the first page of the outgoing fax (e.g., the cover page) for detection and recognition (e.g., optical character recognition (OCR)) of the recipient's fax number and automatically dials it if found. Moreover, the sender's identification (e.g., telephone number and/or name) can also or alternatively be automatically scanned and determined to replace, add to, or otherwise overwrite the default header information programmed into the sending fax machine. In this way, the fax machine can automatically dial the sender's fax number, and/or imprint the customized header on the outgoing faxed pages with the sender's telephone number and/or name. A look-up table may be maintained to correlate specific names of individuals or businesses with specific fax telephone numbers or e-mail addresses. In another embodiment, a scanning white board allows a destination telephone number or e-mail address to be written in a predetermined area, and either periodically or upon demand the white board is scanned, and the image automatically faxed or e-mailed to the designated destination.

23 Claims, 7 Drawing Sheets

AUTOMATIC SEND TO EMBEDDED FAX/E-MAIL ADDRESS

BACKGROUND OF THE INVENTION

1. Field of the Invention

This invention relates generally to the facilitation of common manual tasks such as facsimile transmission and white board presentations. More particularly, it relates to an efficient technique and apparatus for automating facsimile and/or e-mail transmissions in general.

2. Background of Related Art

Two very common tasks performed typically in office environments include sending a facsimile transmission ("fax"), and utilizing a white board in a presentation to a group. The present invention, while not limited to use with only a fax or white board, is described with respect to these two specific examples.

Fax machines, while automating the operations necessary to transmit an image to a remote location over a telephone line, nevertheless requires a certain amount of manual input to control the fax machine. For instance, whenever someone sends a fax with a fax machine, the user typically must manually enter the recipient's telephone number (unless the telephone number happens to already be programmed in the speed dial memory of the fax machine). Even speed dialing requires a small amount of manual selection of the pre-programmed telephone number by the user.

Besides requiring an amount of time for the user to provide the manual input, either method of instructing the fax machine as to the recipient of the fax further incurs a certain amount of risk of error of entry. When manually inputting a recipient's telephone number, there is a significant risk that one or more of the digits will be erroneously input. Fortunately, there is an unlikely chance that the erroneously input telephone number will actually correspond to another fax machine, and thus such an erroneous input typically fails and the sender is immediately made aware of the failure of the outgoing fax. There is a more significant risk that a fax will be transmitted to a wrong fax machine when using speed dial, because each speed dial will presumably correspond to a separate fax machine.

There is a need to not only reduce or eliminate the need for manual input when sending a fax to speed up operations, but also to improve the reliability and reduce the risk of a sending a fax to a wrong fax machine.

The need for reducing or eliminating manual input and improving reliability of successful and correctly addressed transmissions carries over to other tasks. For instance, a white board is used quite often in an office environment as an alternative to the older (and messier) technology of a chalk board.

A white board is a device which has become quite common in today's business world. A white board typically allows the use of a dry erase marker on a large white board wheeled to a location in front of a room. Sophisticated white boards include an internal scanner which scans and prints images, words, and any other marks made on a white board.

The print capability of the sophisticated white boards grew from the need to record the writings on the white board. For instance, a meeting may solicit input from a large group of people, and summarize the group input on the white board as the group assists. At the end (or many times during) the meeting, a person is typically designated to manually "copy down" what remained on the white board. The ability to scan and print the contents of a white board eliminated the need to manually "copy down" the contents of the white board, and made record keeping from white boards more efficient and reliable. The printed records of the white board could then be faxed to another party, scanned and e-mailed to the other party, etc., albeit subjecting the faxing of the printed records to the same manual input problems as any document being faxed.

In addition to the manual input and reliability problems associated with conventional fax machines, relevant regulations typically require the identification of the sending party of a fax to be imprinted in the header of the received document. This identity is typically set once by the installer of a fax machine to an identity of the owner of the fax machine.

However, a number of users may share a fax machine, making the pre-set identifying information preset in the fax machine imprecise or over generalized. For instance, individuals may prefer to receive faxes on their computer fax/modem, or use one of the Internet based services (such as www.efax.com) that provide unique fax numbers to individuals, but nevertheless prefer to send outgoing faxes from a shared fax machine (e.g., in a common area, at a local retail store having fax services, etc.). However, the imprinted identifying information may or may not relate to the identity of the actual individual sending the fax. For instance, the identity may be a retail store name, company name, etc., when the sender would have preferred to have a name or telephone number more closely associated with themselves. This might not be desirable to some, e.g., a person who wants to maintain an individual or department identity with his or her own name and fax number. For instance, a start-up business might want to present their business in the best possible light, and might be embarrassed by the imprinting of the commercial fax service on their outgoing faxes.

The header name to be imprinted on outgoing faxes could be reprogrammed on a fax-by-fax basis, but this would be quite cumbersome and time consuming with respect to each outgoing fax.

Computer faxing solves the problem of requiring manual entry of a destination fax number or e-mail address. However, computer faxing is typically limited to sending only electronic documents. Moreover, speed dial telephone numbers help only for faxes to recipients who are called often by the calling party or otherwise pre-configured in the fax machine.

There is a need for a technique and apparatus to allow flexibility in an outgoing fax (or e-mail), not only by reducing manual entry requirements and improving reliability of the recipient's telephone number, but also with respect to allowing separate individuals to include more accurate identifying header information in an outgoing fax to suit their individual needs.

SUMMARY OF THE INVENTION

In accordance with the principles of the present invention, apparatus to automatically send an image to a desired destination comprises an optical character recognizer adapted to recognize and textually convert destination information scanned from a predetermined location. A modem is adapted to automatically transmit the image based on the textually converted destination information.

A method of automatically sending an image to an embedded destination in accordance with another aspect of the present invention comprises scanning an image of embedded characters in a document for transmission. The scanned image of embedded characters is converted into textual data. The document is automatically sent to a unique destination identified by the textual data.

A method of modifying sender information in an outgoing facsimile in accordance with yet another aspect of the present invention comprises scanning sender information from a predetermined portion of a scanned page of a document. The scanned sender information is included in a header portion of an outgoing facsimile.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to the detection and recognition of embedded identity information such as a name and/or facsimile telephone number in an imaged document for transmission, conversion of the recognized name, fax number or e-mail address into textual information, and automatic transmission of the imaged document to the fax number or e-mail indicated by the textual information.

In particular, in a first embodiment, the present invention adds the capability to a fax machine to scan the first page of the outgoing fax (e.g., the cover page) for detection and recognition (e.g., optical character recognition (OCR)) of the recipient's fax number and automatically dials it if found. Moreover, the sender's identification (e.g., telephone number and/or name) can also or alternatively be automatically scanned and determined to replace, add to, or otherwise overwrite the default header information programmed into the sending fax machine. In this way, the fax machine can automatically dial the sender's fax number, and/or imprint the customized header on the outgoing faxed pages with the sender's telephone number and/or name.

Figure 1:
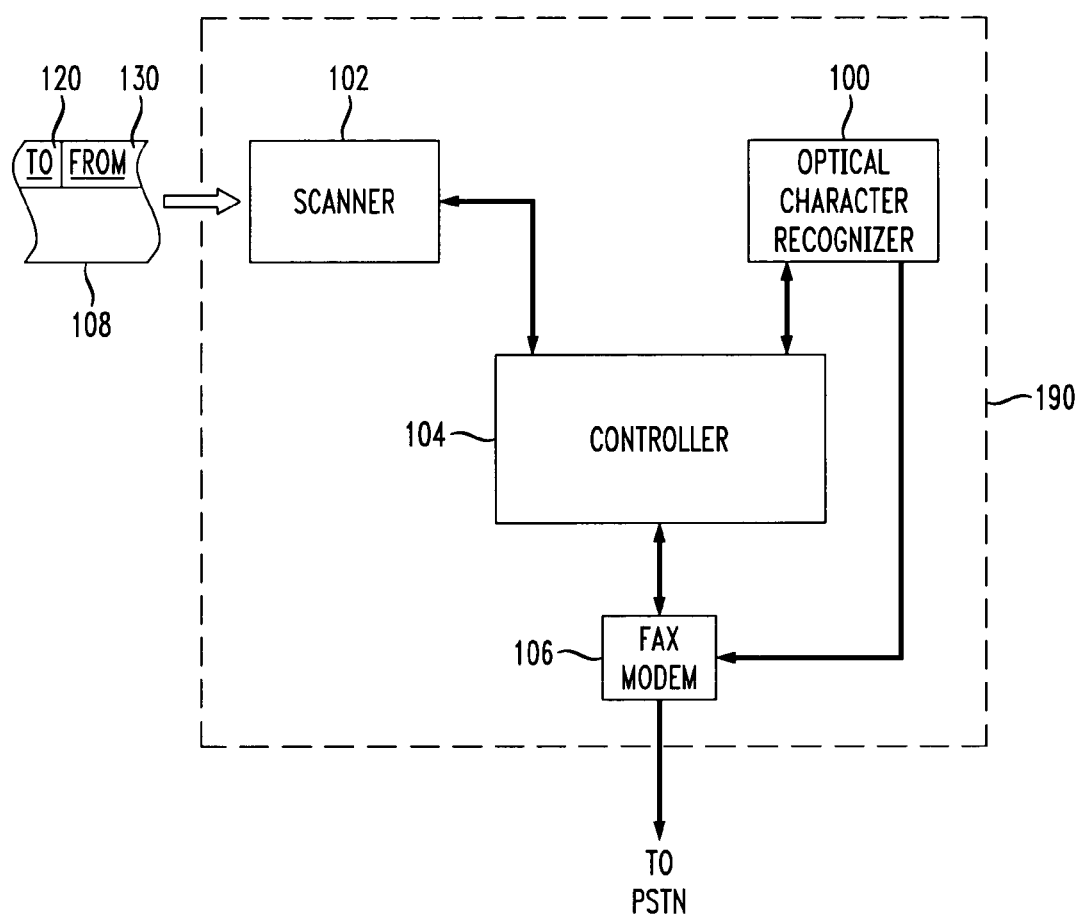
FIG. 1 depicts a generalization of the principles of one aspect of the present invention wherein a recipient's facsimile (fax) number and a sender's identifying information are scanned by a scanner, detected, recognized and converted into textual information by an optical character recognizer, and used to automatically send the fax without requiring manual input of the recipient's fax number, in accordance with the principles of the present invention.

FIG. 1 depicts a generalization of the principles of one aspect of the present invention wherein a recipient's facsimile (fax) number and a sender's identifying information are scanned by a scanner, detected, recognized and converted into textual information by an optical character recognizer, and used to automatically send the fax without requiring manual input of the recipient's fax number, in accordance with the principles of the present invention.

In particular, in FIG. 1, a fax machine 190 includes a scanner 102 and fax modem 106 in communication with a suitable controller 104.

The scanner 102 may be any otherwise conventional scanner commonly associated with fax machines. Similarly, the fax modem 106 is an otherwise conventional fax modem 106 commonly associated with fax machines.

The controller 104 may be any appropriate processor, e.g., microprocessor, microcontroller, or digital signal processor (DSP), or may be a stand alone computer system such as a personal computer (PC). The controller 104 includes the ability to auto dial a fax number detected, recognized and converted to textual information (e.g., ASCII text) from the front page of the fax (e.g., from a predetermined region of the front page).

Preferably, the recipient's fax number or other identification information regarding the recipient would be located and thus embedded in the scanned image in its own pre-defined region of the first page, e.g., in the upper left hand corner 120. Also, the sender's identification is preferably embedded by being typed or hand written in a predefined region of the page, e.g., in the upper right hand corner 130.

Preferably, the recipient's fax number and the sender's identifying information are typed using a common font, e.g., courier. However, using a suitable optical character recognizer, embedded handwritten characters and numbers can be detected, recognized and converted to textual information in accordance with the principles of the present invention.

Figure 2:
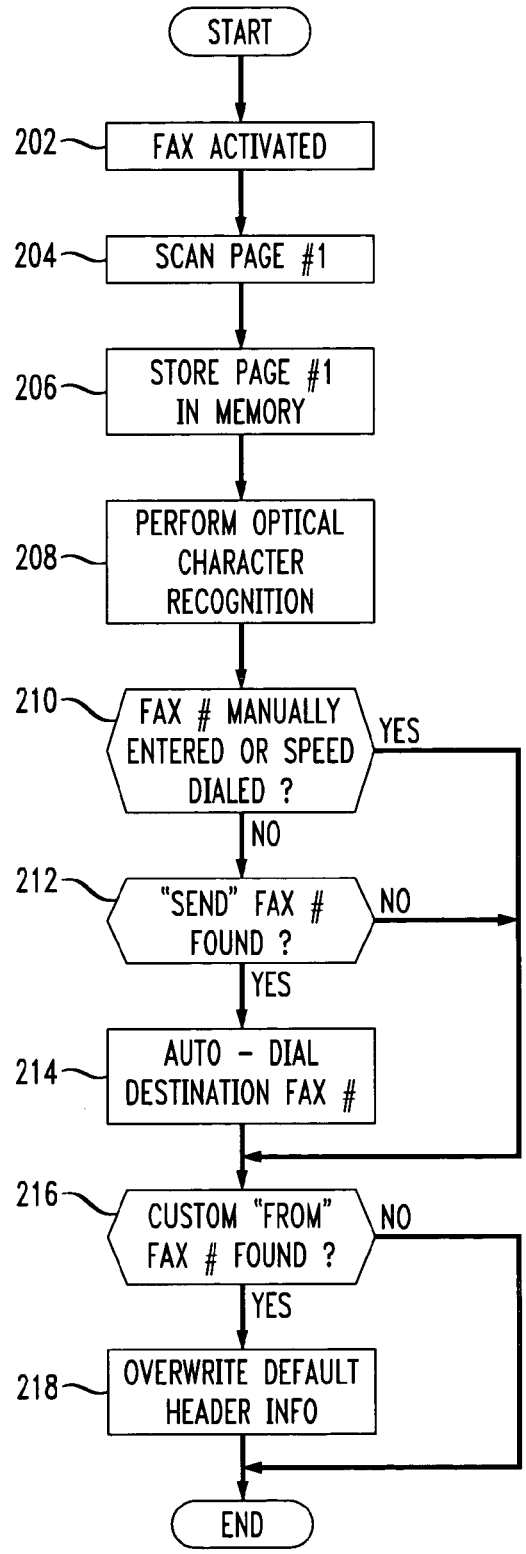
FIG. 2 shows an exemplary process by which an embedded fax number for a recipient is detected, recognized, converted to textual information, and used to automatically send a fax transmission, in accordance with the principles of the present invention.

FIG. 2 shows an exemplary process by which an embedded fax number for a recipient is detected, recognized, converted to textual information, and used to automatically send a fax transmission, in accordance with the principles of the present invention.

In particular, in FIG. 2, a fax machine 190 such as that shown in FIG. 1 is activated in step 202.

In step 204, at least the first page of a fax (or at least the portions 120, 130 of the page including the recipient's fax number and/or the sender's identifying information) is scanned by the scanner 102.

In step 206, the scanned portion is stored in an appropriate location in memory accessible by the controller 104.

In step 208, the embedded recipient's fax number and/or the sender's identifying information is detected, recognized, and converted to textual information (e.g., ASCII information) recognized by the fax modem 106 as a fax number to be dialed.

In step 210, the fax machine 190 determines whether or not the fax number was manually entered or speed dialed. In this way otherwise conventional operation of the fax machine 190 is permitted. If the fax number was manually entered, or if the fax number was selected using an appropriate speed dial button, the process shown in FIG. 2 proceeds to deal with any custom sender's identifying information in step 216. Otherwise, the process proceeds to step 212.

In step 212, the controller 104 determines from the optical character recognizer 100 whether or not customized sender identifying information was included in the appropriate region 130 of the first page of the outgoing fax. If not, the process proceeds to deal with any custom sender's identifying information in step 216. Otherwise, the process proceeds to step 214.

In step 214, the fax modem 106 is controlled by the controller 104 to automatically dial the detected, recognized, and textually converted recipient's telephone number.

In step 216, the controller 104 determines from the optical character recognizer 100 whether or not any customized sender identifying information was detected, recognized and textually converted from the appropriate region 130 on the first page of the outgoing fax. If not, the process ends.

In step 218, the default header information is either overwritten or appended to.

If customized sender identifying information is found on the first page of the outgoing fax, the sender identifying information is appropriately used instead of the default identifying information pre-set into the fax machine 190.

Instead of overwriting and thus replacing the default sender identifying information otherwise imprinted in the header portion of each page of the outgoing fax, the custom sender's identifying information may be appended or otherwise added to the identifying information pre-set into the fax machine 190, in accordance with the principles of the present invention.

Instead of utilizing predefined areas 120, 130 for entering the recipient's fax number and/or the sender's identifying information, another approach is to perform optical character recognition on the entire first page of the fax, looking for a predefined label (e.g., "Recipient's Fax Number:" and "Sender's Identity:"), and then utilizing information that follows the found label as, e.g., the outgoing fax number to be dialed and/or the sender's identifying information.

Preferably, the detected, recognized and textually converted recipient's telephone number (and/or the sender's identifying information) can be displayed for confirmation by the user before the outgoing fax call is made. Once a valid fax number is found (and confirmed by the user), the fax machine 190 automatically dials the recipient's fax machine and transfers the facsimile transmission in an otherwise conventional manner.

In a similar manner, the fax machine 190 reads the sender's custom identification information, e.g., their main fax number and/or personal or business name, and displays and stores the sender's custom identification information as necessary. Once valid sender identification information is found, the header of the outgoing fax is overwritten or appended to as desired by the user to include the sender identification information. The fax machine 190 can be pre-configured to enable specific abilities, e.g., whether or not to overwrite or append the sender's identifying information.

Customization of the header of outgoing faxes is quite advantageous and useful for those in both large and small businesses, particularly where different fax machines are used for transmission and reception of faxes.

For instance, many large businesses dedicate facsimile machines for use in either an outgoing capacity or in an incoming capacity, and although the outgoing faxes may be transmitted using separate telephone lines carrying separate telephone numbers, it may be desirable to include a common telephone number in the header of outgoing faxes corresponding to the incoming fax number for the business. Furthermore, some small businesses utilize outside services to handle outgoing faxes, and outgoing faxes from the outside services typically include identification information for the fax service in the header portion of their outgoing faxes.

Moreover, in an example of an office environment where everyone uses their own PC to receive faxes but utilizes a common transmission fax machine will be required to have the common, default header imprinted on outgoing faxes. The converse example is where those in an office might receive faxes on a shared fax machine but who send faxes from their own personal PC fax/modems. In this case, appropriate OCR software in the PC can process the content of the appropriate (e.g., first) page of the fax and determine what custom sender identification information if any (e.g., fax number and/or personal or business name) to imprint on the top of each outgoing fax page. If custom sender identification information is not found, either by looking for a label or for information in a specific area of the first page of the outgoing fax, the header may contain the default fax number and/or other sender identification information as in an otherwise conventional manner.

Certain advantages are provided by the described embodiments of the present invention. For instance, dialing on an alphanumeric keypad is greatly reduced or eliminated, reducing the overall required amount of time and effort to send an outgoing fax. Moreover, keypress errors are eliminated, particularly when confirmation by the user is implemented, making the facsimile transmission more efficient and reliable.

Furthermore, once scanned, detected and converted, a fax telephone number can be added to speed dial memory at the direction of the user, e.g., by accepting a confirmation button, etc.

Additionally, in accordance with the principles of the present invention, if the OCR of the recipient's address information fails, appropriate error processing may allow the user to erase and rewrite the recipient's fax telephone number in the appropriate portion of the white board, or to "re-fax" or re-scan the first page of an outgoing fax to allow additional attempts.

Moreover, the ability to customize the header information imprinted on each outgoing fax page relating to the identification of the sender is useful particularly to the small office/home office user who relies on fax machines other than their own but would prefer not to give the appearance of not having their own dedicated fax machine.

The customized header may or may not be converted to textual information. For instance, a particular logo or other information may be directly transferred from the scanned area of the first page of the outgoing fax into the appropriate location of the header of the fax, with reduction (or enlargement) as necessary to fit within the header.

Perhaps very importantly, reliability and confidentiality is improved by allowing the fax machine to send a fax to the fax number printed on the first page of the outgoing fax and not to whoever the fax machine operator manually inputs or speed dials (either correctly or incorrectly).

Other office tasks can be automated to make use of the detection and recognition of the embedded recipient's fax number and/or e-mail address, in accordance with another aspect of the present invention.

Figure 3A:
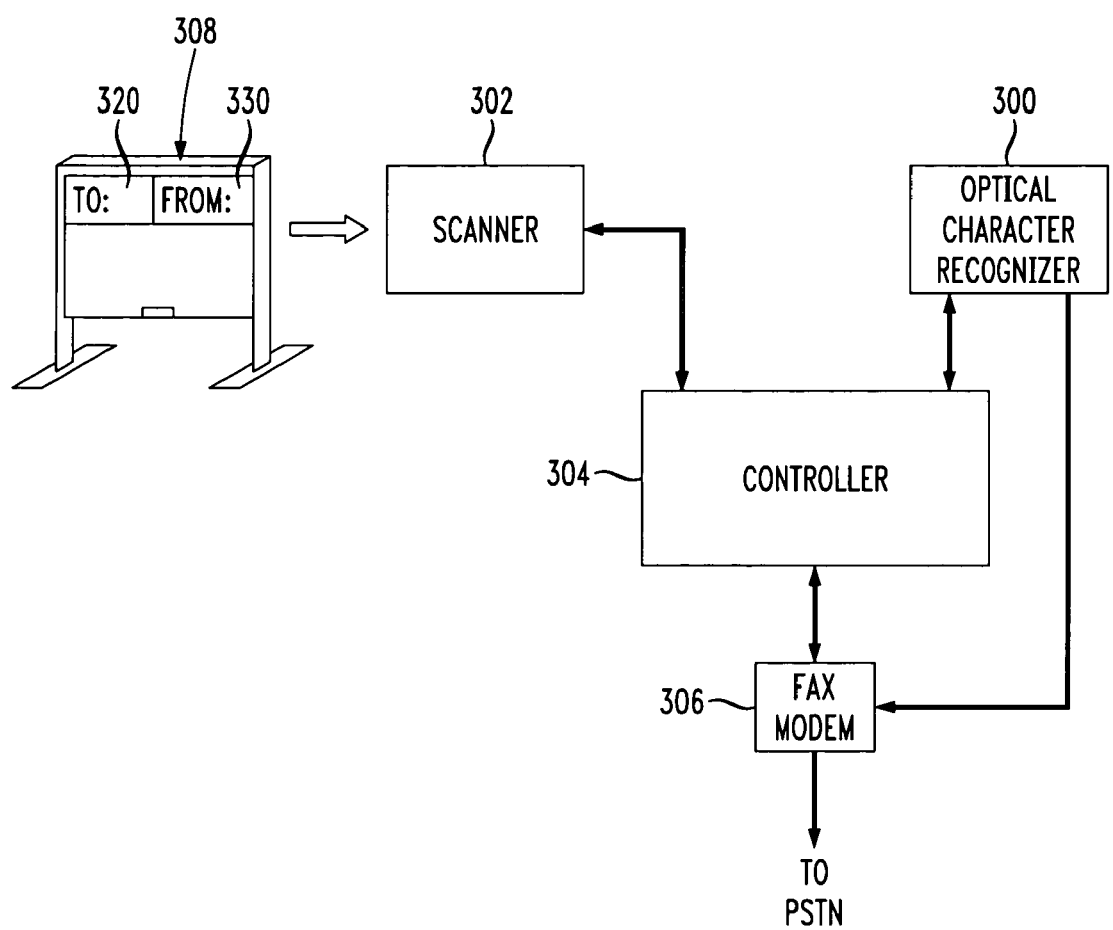
FIG. 3A shows a variation of FIG. 1 wherein a white board includes a scanner wired to a computer, and wherein an embedded fax number or e-mail address of a recipient is detected, recognized, converted to textual information, and used to automatically fax or e-mail the scanned image from the white board, in accordance with another embodiment of the present invention.

FIG. 3A shows a variation of FIG. 1 wherein a white board includes a scanner wired to a computer, and wherein an embedded fax number or e-mail address of a recipient is detected, recognized, converted to textual information, and used to automatically fax or e-mail the scanned image from the white board, in accordance with another embodiment of the present invention.

In particular, in FIG. 3A, a white board 308 includes an area 320 designated to contain a fax number of a recipient, and/or another area 330 designated to contain custom identifying information regarding the sender. The white board further includes a scanner 302 capable of scanning the image imprinted on the white board, a controller 304, and a fax modem 306.

A suitable scanner 302 is that which is conventionally included in scanning and printing white boards. The controller 304 may be any suitable processor, e.g., microcontroller, microprocessor, or digital signal processor (DSP). The controller 304 may also be a suitable computer system such as a PC.

In accordance with the principles of the present invention, the white board 308 further includes an optical character recognizer application program running on the controller 304 capable of recognizing handwritten characters and numbers.

Figure 3B:
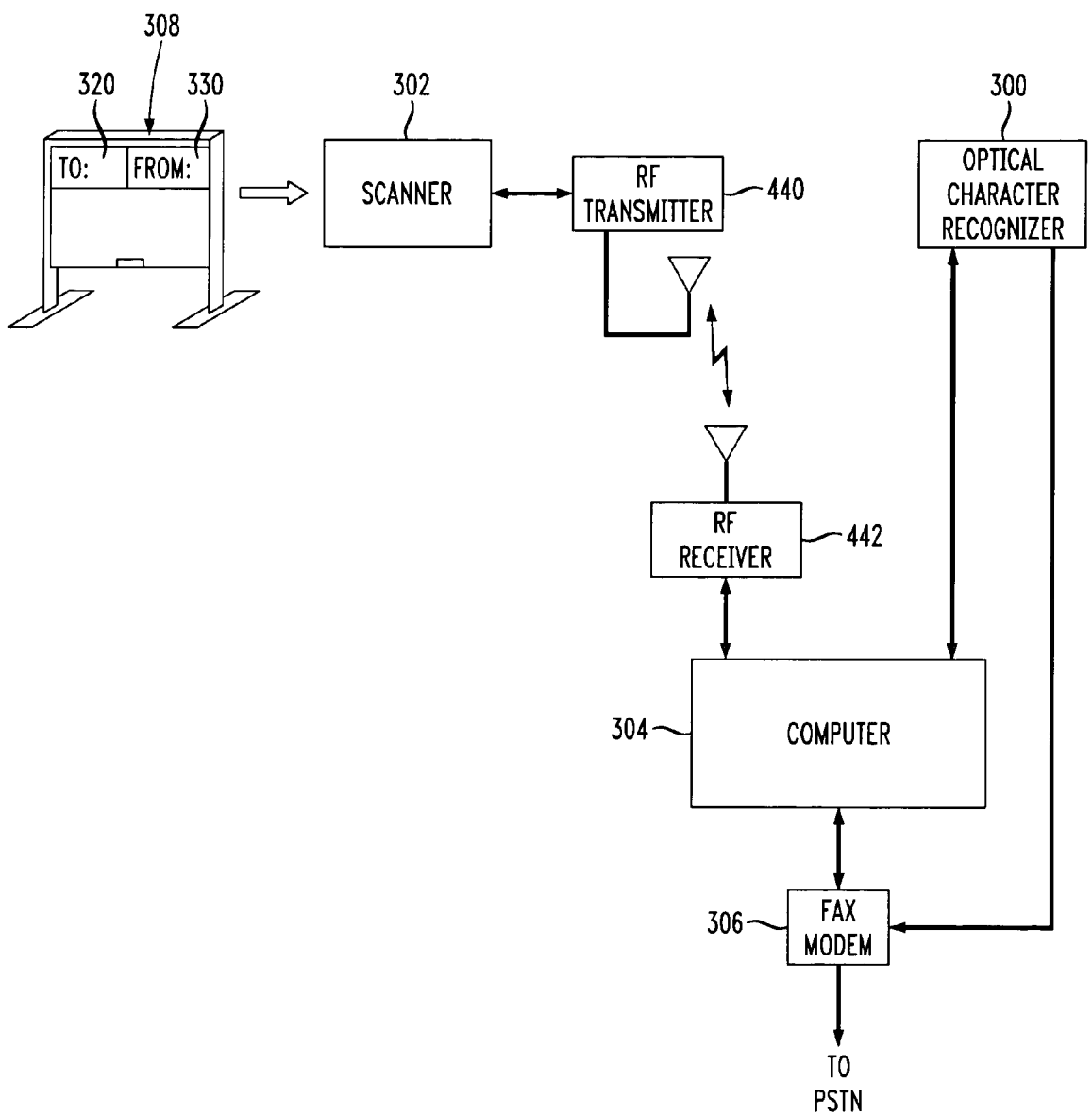
FIG. 3B shows another embodiment of the scanning white board shown in FIG. 3A but including a wireless link between the white board and the computer, in accordance with yet another aspect of the present invention.

FIG. 3B shows another embodiment of the scanning white board 308 shown in FIG. 3A but including a wireless link formed between the white board 308 and the computer 304, in accordance with yet another aspect of the present invention.

In particular, a wireless link is formed between a radio frequency (RF) transmitter 440 associated with the scanner 302 in the white board and an RF receiver 442 associated with the computer 304. The RF transmitter 440 and RF receiver 442 may be any suitable RF transmitter and receiver pair. For instance, the RF transmitter 440 and receiver 442 may be piconet devices conforming to the BLUETOOTH standard, 900 MHz cordless telephone type RF front end devices utilizing transmission techniques otherwise used in digital cordless telephones. Such 900 MHz devices may or may not include frequency hopping or forward error correction (FEC).

In particular, in the embodiments shown in FIGS. 3A and 3B, the white board 308 includes an integrated scanner 302 for copying the written content on the white board 308. A wired (FIG. 3A) or wireless (FIG. 3B) data link is added between the device storing the scanned digital image (e.g., the scanner memory) and the computer 304 (e.g., a personal computer (PC)) having access to others (e.g., using the Internet or the public switched telephone network (PSTN)). While the data communications between the white board 308 and the computer is preferred to be a wireless link as shown in FIG. 3B, it is within the principles of the present invention to include a wired link between the white board 308 and the computer 304 as shown in FIG. 3A.

In accordance with the white board embodiments, the white board information is scanned and then sent via the wired or wireless link to the computer 304. This data transmission can eliminate the need for the printed hard copy of the image, particularly if all that is desired is to transmit (e.g., fax or e-mail) the information to a remote location.

For instance, the automated fax white board in accordance with the principles of the present invention can support a live "conference" of sorts with a remote party by occasionally or periodically faxing or e-mailing the contents of the white board to a remote party's fax machine. The automated transmissions can be performed periodically, e.g., every minute, or upon demand by the user of the white board by pressing a dedicated button to the computer 304.

Similar with respect to the facsimile embodiment, the white board 308 preferably contains a pre-defined physical area(s) 320, 330 wherein the user can write the facsimile number or e-mail of the person(s) they want to send the info to. Thus, the white board preferably includes a predefined area for the user to write in the recipient's fax number or e-mail address. In the described embodiment, the white board also includes a dedicated area for the user to write identifying information regarding the sender (e.g., the sender's fax number, or personal or business name).

The computer 304 can include a table associating proper names of individuals or businesses with a specific one or more fax numbers and/or e-mail addresses. In this way, an identifying name may be used in the pre-defined physical area(s) 320, 330 of the white board 308 instead of the specific fax number or e-mail address, allowing the computer 304 to associate the specific fax number(s) and e-mail address(es) with the desired recipient and/or sender's name written into the pre-defined areas 320, 330.

Thus, a look up table may be maintained to correlate common names with appropriate fax numbers and/or e-mail addresses, within the principles of the present invention. Therefore, a short name such as "Harry" can be written in the appropriate location on the fax cover sheet or white board, recognized using the optical character recognizer, and matched to an appropriate fax number and/or e-mail address.

Figure 4:
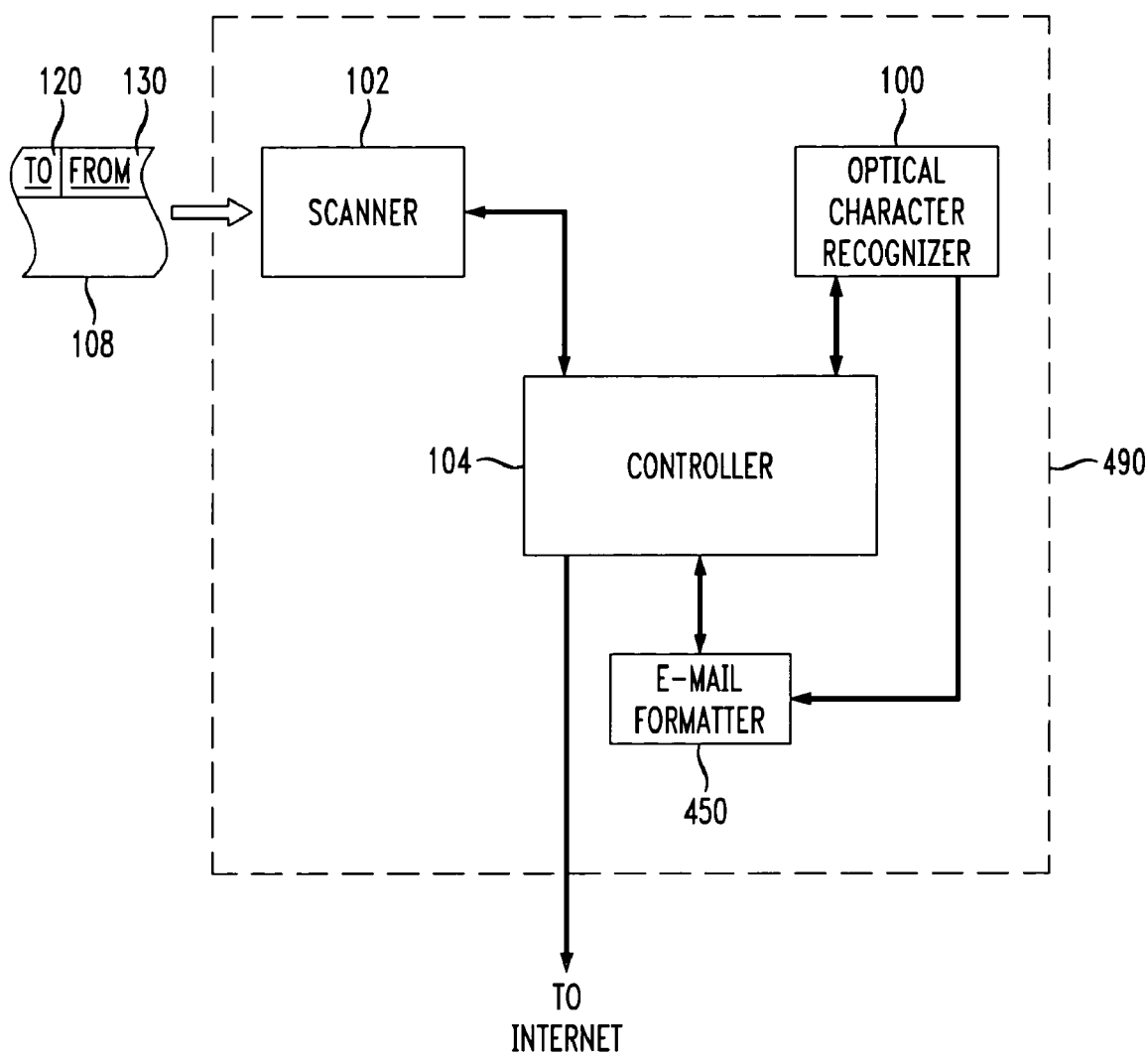
FIG. 4 shows yet another embodiment of the present invention wherein a recipient's e-mail address and a sender's identifying information (e.g., return e-mail address) are scanned by a scanner, detected, recognized and converted into textual information by an optical character recognizer, and used to address an e-mail message to the recipient with an attached file including the image(s) of the scanned fax transmission, in accordance with the principles of the present invention.

FIG. 4 shows yet another embodiment of the present invention wherein a recipient's e-mail address and a sender's identifying information (e.g., return e-mail address) are scanned by a scanner, detected, recognized and converted into textual information by an optical character recognizer, and used to address an e-mail message to the recipient with an attached file including the image(s) of the scanned fax transmission, in accordance with the principles of the present invention.

In particular, in FIG. 4, the fax device 490 includes an e-mail formatter 450. The destination e-mail address is scanned, detected and textually converted from the appropriate location 120 of the first page of the scanned image. The e-mail formatter 450 retrieves the text data for the destination address and generates an e-mail message to that destination address, attaching the image files of the scanned page(s).

Once scanned, the information scanned from the pre-defined area 120 of the white board 108 is processed by the optical character recognizer 100 to generate textual data (e.g., ASCII data) corresponding to a destination or recipient e-mail address. Once detected and recognized, the textual e-mail address is either used directly or indirectly through an appropriate look-up table to determine a desired e-mail address or addresses.

The principles of the present invention may be made sufficiently flexible to allow faxing or e-mailing, depending upon the input recipient information. For instance, both a fax modem and an e-mail formatter may be included within the same fax device to allow faxing and/or e-mailing to the desired recipient(s), depending upon the information detected, recognized and textually converted from the first page of the scan. In this case, if the scanned textual information relates to a fax number, the fax number is automatically dialed by the fax modem. If, on the other hand, the scanned textual information relates to an e-mail address, the scanned image is converted by an appropriate application program in the controller 404 (e.g., PC) into a suitable graphics file, e.g., a ".PDF" file, compressed G3 or G4 image file, paintbrush file, ".JPG" file, etc., or even OCR conversion to text format (e.g., ASCII), and all pages (i.e., images) of the scan are e-mailed to the desired recipient (together with the customized header, if desired).

Figure 5:
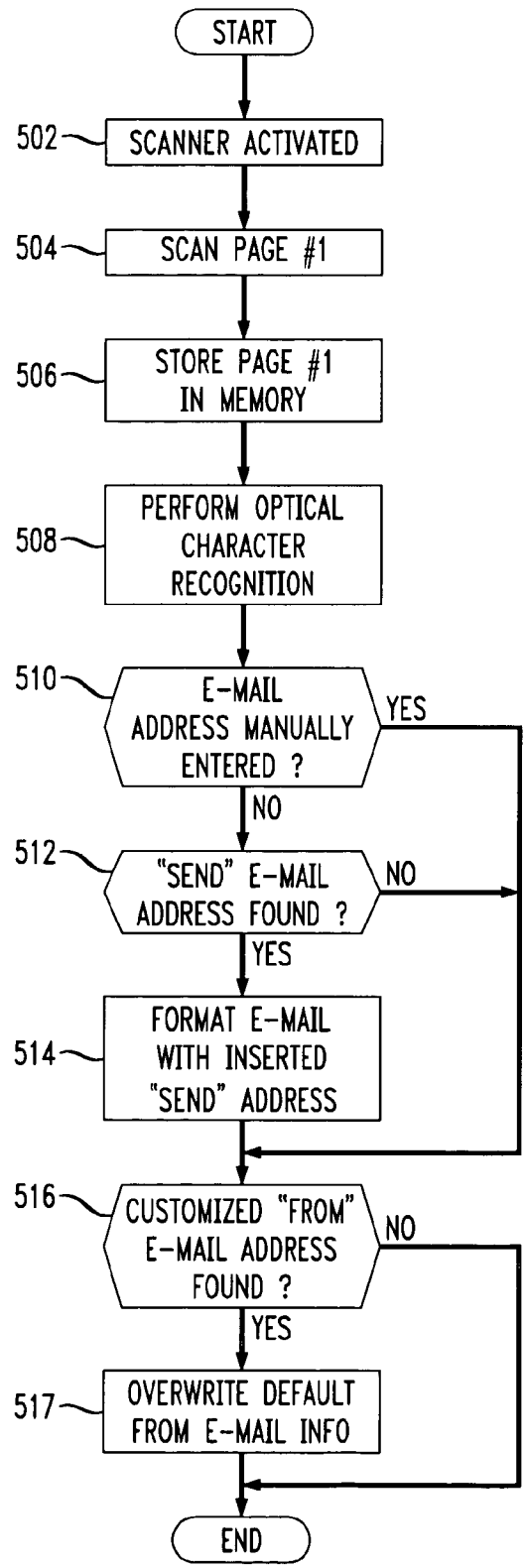
FIG. 5 shows an exemplary process by which an embedded e-mail address for a recipient is detected, recognized, converted to textual information, and used to automatically send an e-mail message including an attached image file including the scanned fax pages, in accordance with the principles of the present invention.

FIG. 5 shows an exemplary process by which an embedded e-mail address for a recipient is detected, recognized, converted to textual information, and used to automatically send an e-mail message including an attached image file including the scanned fax pages, in accordance with the principles of the present invention.

In particular, in FIG. 5, a fax machine 490 such as that shown in FIG. 4 is activated in step 502.

In step 504, at least the first page of a fax (or at least the portions 120, 130 of the page including the recipient's fax number and/or the sender's identifying information) is scanned by the scanner 102.

In step 506, the scanned portion is stored in an appropriate location in memory accessible by the controller 404.

In step 508, the embedded recipient's e-mail address and/or the sender's identifying information is detected, recognized, and converted to textual information (e.g., ASCII information) recognized by the e-mail formatter 450 as a valid e-mail address accessible via the Internet.

In step 510, the fax machine 490 determines whether or not the e-mail address was manually entered. In this way otherwise conventional operation of the fax machine 490 is permitted. If the e-mail address number was manually entered, the process shown in FIG. 5 proceeds to deal with any custom sender's identifying information in step 516. Otherwise, the process proceeds to step 512.

In step 512, the controller 404 determines from the optical character recognizer 100 whether or not customized sender identifying information was included in the appropriate region 130 of the first page of the outgoing fax. If so, a textual e-mail address is determined. If not, the process proceeds to deal with any custom sender's identifying information in step 516. Otherwise, the process proceeds to step 514.

In step 514, the e-mail formatter 450 is controlled by the controller 404 to automatically generate an e-mail message, properly address the generated e-mail message, and attach the image files of the scanned document to the generated e-mail message (not necessarily in that order).

In step 516, the controller 404 determines from the optical character recognizer 100 whether or not any customized sender identifying information was detected, recognized and textually converted from the appropriate region 130 on the first page of the outgoing fax. If not, the process ends.

In step 517, the default "FROM" e-mail information is either overwritten or appended to.

Figure 6:
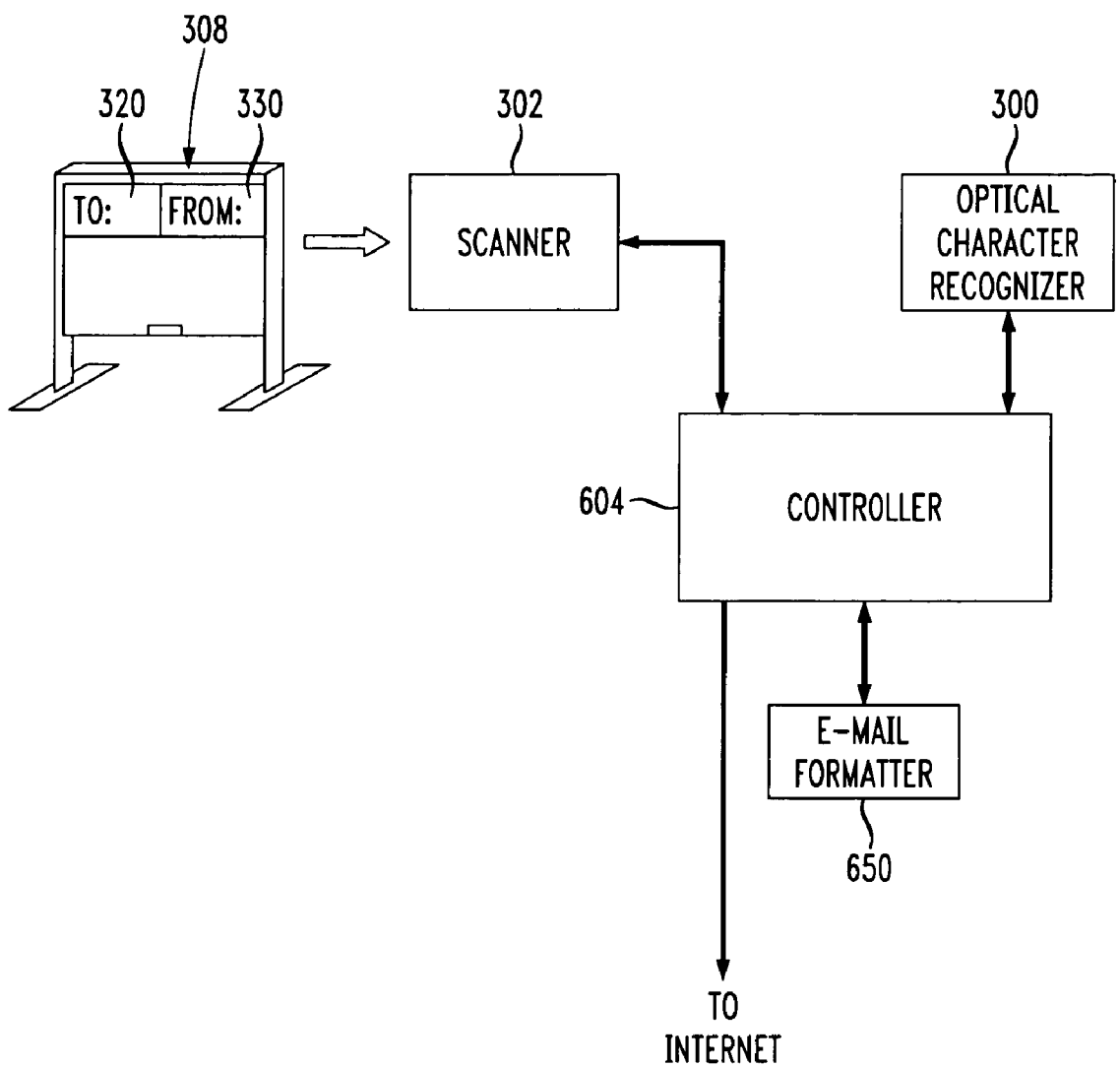
FIG. 6 extends the white board embedded information detector, recognizer to include an e-mail formatter and automatic e-mail to an e-mail address written in a pre-designated "TO:" area of the white board, in accordance with another embodiment of the present invention.

FIG. 6 extends the white board embedded information detector and recognizer to include an e-mail formatter 650.

In the embodiment of FIG. 6, the scanned image is automatically e-mailed to an e-mail address written in a pre-designated "TO:" area 320 of the white board 308, in accordance with another embodiment of the present invention. Sender or "FROM:" information may also be scanned, detected, textually converted and included with the automatically formatted and sent e-mail.

In accordance with the principles of the present invention, the fax number or e-mail address of the person to which the white board scanned information is to be sent is written by the user on the white board in an appropriate location (e.g., upper left hand corner). Moreover, custom sender information (e.g., fax number, e-mail address, etc.) may be written by the user in another location (e.g., upper right hand corner). The recipient's fax number (or e-mail address) is determined using, e.g., optical character recognition (OCR). The OCR may be located in the white board or in the controller.

A scanning white board including automatic detection and recognition of embedded recipient address information in accordance with this aspect of the present invention eliminates the need for manual faxing or e-mailing of the printed copy of the white boards contents to one or more destinations, allowing easy distribution of the information contained on the white board to remote locations.

While described embodiments implement automatic transmission to a single recipient, the principles of the present invention relate equally to the designation of a plurality of recipient's of any one particular fax or e-mail. For instance, either a group name can be designated on the written cover sheet of the fax or on the white board, and the computer can associate that particular group name with a plurality of recipients to be contacted. Thus, it is within the principles of the present invention for one or more recipient's to be faxed and e-mailed, as designated either in the appropriate predetermined location on the first page of the fax cover sheet (or location on the white board), or as configured into an appropriate look-up table accessible by the computer controlling the fax or e-mail device.

While the invention has been described with reference to the exemplary embodiments thereof, those skilled in the art will be able to make various modifications to the described embodiments of the invention without departing from the true spirit and scope of the invention.

What is claimed is:

1. Apparatus to automatically send an image to a desired destination, comprising:
    an optical character recognizer adapted to recognize and textually convert header information scanned from a predetermined location, said textually converted header information is sender information; and
    a modem adapted to automatically transmit said image with said textually converted header information at a header location on an outgoing document in place of a default header based on said textually converted header information.

2. The apparatus to automatically send an image to a desired destination according to claim 1, wherein:
    said modem transmits said image to a telephone number corresponding to a facsimile machine identified by said textually converted destination information.

3. The apparatus to automatically send an image to a desired destination according to claim 1, further comprising:
    a white board including a scanner.

4. The apparatus to automatically send an image to a desired destination according to claim 3, further comprising:
    a wireless link between said scanner and said fax modem.

5. A method of automatically sending an image to an embedded destination, comprising:
    scanning an image of embedded characters in a document for transmission;

converting said scanned image of embedded characters into textual data, said textual data is sender information; and automatically sending said document to a unique destination with a header identified by said textual data at a header location on an outgoing document in place of a default header.

6. The method of automatically sending an image to an embedded destination in accordance with claim 5, further comprising:

displaying said textual data.

7. The method of automatically sending an image to an embedded destination in accordance with claim 6, further comprising:

requiring confirmation of said textual data before allowing said step of automatically sending said image of said document.

8. The method of automatically sending an image to an embedded destination in accordance with claim 5, further comprising:

recognizing said embedded characters using an optical character recognizer.

9. The method of automatically sending an image to an embedded destination in accordance with claim 8, wherein:

said embedded characters correspond to a fax telephone number.

10. The method of automatically sending an image to an embedded destination in accordance with claim 8, wherein:

said embedded characters correspond to an e-mail address.

11. The method of automatically sending an image to an embedded destination in accordance with claim 5, further comprising:

basing a method of said automatic sending based on a type of said embedded characters.

12. Apparatus for automatically sending an image to an embedded destination, comprising:

means for scanning an image of embedded characters in a document for transmission;

means for converting said scanned image of embedded characters into textual data, said textual data is sender information; and means for automatically sending said document to a unique destination with a header identified by said textual data at a header location on an outgoing document in place of a default header.

13. The apparatus for automatically sending an image to an embedded destination in accordance with claim 12, further comprising:

means for displaying said textual data.

14. The apparatus for automatically sending an image to an embedded destination in accordance with claim 13, further comprising:

means for requiring confirmation of said textual data before allowing said step of automatically sending said image of said document.

15. The apparatus for automatically sending an image to an embedded destination in accordance with claim 12, further comprising:

means for recognizing said embedded characters using an optical character recognizer.

16. The apparatus for automatically sending an image to an embedded destination in accordance with claim 15, wherein:

said embedded characters correspond to a fax telephone number.

17. The apparatus for automatically sending an image to an embedded destination in accordance with claim 15, wherein:

said embedded characters correspond to an e-mail address.

18. The apparatus for automatically sending an image to an embedded destination in accordance with claim 12, further comprising:

means for basing a method of said automatic sending based on a type of said embedded characters.

19. A method of modifying sender information in an outgoing facsimile, comprising:

scanning sender information from a predetermined portion of a scanned page of a document;

textually converting said sender information into textual sender information; and including said textual sender information in a header portion of an outgoing facsimile in place of a default header.

20. The method of modifying sender information in an outgoing facsimile according to claim 19, wherein:

said scanned page is a first page of said document.

21. The method of modifying sender information in an outgoing facsimile according to claim 19, wherein:

said scanned sender information is appended to default sender information.

22. The method of modifying sender information in an outgoing facsimile according to claim 19, wherein:

said scanned sender information replaces default sender information.

23. Apparatus for modifying sender information in an outgoing facsimile, comprising:

means for scanning sender information from a predetermined portion of a scanned page of a document; and means for textually converting said sender information into textual sender information; and means including said textual scanned sender information in a header portion of an outgoing facsimile in place of a default header.

* * * * *